(12) United States Patent
Kaneda et al.

(10) Patent No.: US 7,305,619 B2
(45) Date of Patent: Dec. 4, 2007

(54) IMAGE PROCESSING METHOD, DEVICE AND STORAGE MEDIUM THEREFOR

(75) Inventors: Kitahiro Kaneda, Kanagawa-Ken (JP); Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/748,208

(22) Filed: Dec. 31, 2003

(65) Prior Publication Data
US 2004/0161149 A1 Aug. 19, 2004

Related U.S. Application Data

(62) Division of application No. 09/322,029, filed on May 28, 1999, now abandoned.

(30) Foreign Application Priority Data

Jun. 1, 1998 (JP) ................................. 10-151183
May 18, 1999 (JP) ................................. 11-137080

(51) Int. Cl.
*G06F 15/00* (2006.01)
*G06K 9/32* (2006.01)
*G06K 9/36* (2006.01)

(52) U.S. Cl. .................. 715/526; 715/500.1; 715/764; 715/810; 382/276; 382/296; 382/297

(58) Field of Classification Search ............. 715/500.1, 715/526, 764, 778, 810; 382/197, 290, 276, 382/297
See application file for complete search history.

(56) References Cited

U.S. PATENT DOCUMENTS

| | | | | |
|---|---|---|---|---|
| 4,926,490 A | | 5/1990 | Mano .............................. 382/9 |
| 5,077,811 A | * | 12/1991 | Onda .......................... 382/290 |
| 5,694,486 A | * | 12/1997 | Shigeeda et al. ........... 382/197 |
| 5,960,229 A | * | 9/1999 | Fukuoka et al. .............. 399/17 |
| 6,041,205 A | * | 3/2000 | Funada et al. .............. 399/196 |
| 6,084,988 A | * | 7/2000 | Kanno et al. ............... 358/450 |
| 6,137,905 A | * | 10/2000 | Takaoka ..................... 382/173 |
| 6,173,088 B1 | * | 1/2001 | Koh et al. ................... 382/289 |
| 6,266,162 B1 | * | 7/2001 | Okamura et al. ........... 358/468 |

(Continued)

FOREIGN PATENT DOCUMENTS

JP 10-147620 6/1998

OTHER PUBLICATIONS

Ulead Systems, Inc., "PhotoImpact Version 3.0", Copyright 1992-1995 (English Edition Jan. 1996), pp. 90-92 and 155-156.*

*Primary Examiner*—Rachna Singh
(74) *Attorney, Agent, or Firm*—Fitzpatrick, Cella, Harper & Scinto (57) ABSTRACT

The invention significantly improves operability by automatically discriminating a plurality of image orientations, which are not assured of always being fed in common orientations, and reduces possible burdens to operators by eliminating efforts required to arrange the images in a common orientation before feeding or to correct each orientations into a common orientation after feeding. The invention improves the operability also by enabling modes in which orientation discrimination as well as tilt corrections can be performed before operator's instructions, if the Auto mode has been specified for the orientation recognition function. The invention also improves accuracy of processing by determining whether orientations or tilt recognition is proper and providing the result to the operators.

18 Claims, 6 Drawing Sheets

U.S. PATENT DOCUMENTS

| | | | |
|---|---|---|---|
| 6,324,554 B1 * | 11/2001 | Watanabe et al. | 715/517 |
| 6,329,979 B1 * | 12/2001 | Arimoto et al. | 345/168 |
| 6,332,149 B1 * | 12/2001 | Warmus et al. | 715/517 |
| 7,039,876 B2 * | 5/2006 | Lavendel et al. | 715/777 |
| 2007/0033537 A1 * | 2/2007 | Mander et al. | 715/764 |

* cited by examiner

IMAGE PROCESSING METHOD, DEVICE AND STORAGE MEDIUM THEREFOR

CROSS REFERENCE TO RELATED APPLICATION

This application is a division of Application No. 09/322,029, filed May 28, 1999 now abandoned.

BACKGROUND OF THE INVENTION

1. Field of the Invention

The present invention relates to discriminating orientation of an input image.

2. Related Background Art

In recent years, document digitizing devices like character recognition devices or facsimile apparatuses have been developed to be in a realization as computer technology has higher performance. With the wide spread of these devices, principally in business applications, demand has been growing for converting vast amounts of documents to image data at a time with a scanner having an auto document feeder (ADF). For that purpose, efficiency is attracting the most attention from industry.

Typically, ADFs are fed with numerous documents of the same size and orientation. If documents in longitudinal direction and lateral direction are mixed, obtained image data will have different orientations. If some documents have different sizes, such documents may tend to rotate in travelling in an ADF and obtained image data will be more likely to have a wrong orientation.

Since a conventional character recognition device or a filing device assumes that documents is processed in a common orientation, an operator arranges their orientations to be in a common orientation before the documents are fed into such a device. Moreover, in order to ensure proper operations, after documents have been processed by a device, an operator must visually inspect all document images on a display one after another and if they have wrong orientations, the operator must provide an instruction to arrange it by an appropriate angle (90°, 180° or 270°) accordingly. Therefore, processing vast amounts of documents at a time may significantly degrade practicability of the devices in the point of light efficiency and burden to operators.

SUMMARY OF THE INVENTION

The purpose of the present invention is to reduce operators' burdens and improve efficiency by automatically discriminating orientations of a plurality of images which are not always fed in a common orientation.

Another purpose of the present invention is to reduce possible burdens to operator and improve efficiency by automatically discriminating orientation of each of a plurality of images which may have different orientations.

Furthermore, another purpose of the present invention is to improve accuracy of processing by judging if results of automatic discrimination are not normal and informing exteriors of the results.

DETAILED DESCRIPTION OF THE PREFERRED EMBODIMENTS

Figure 4:
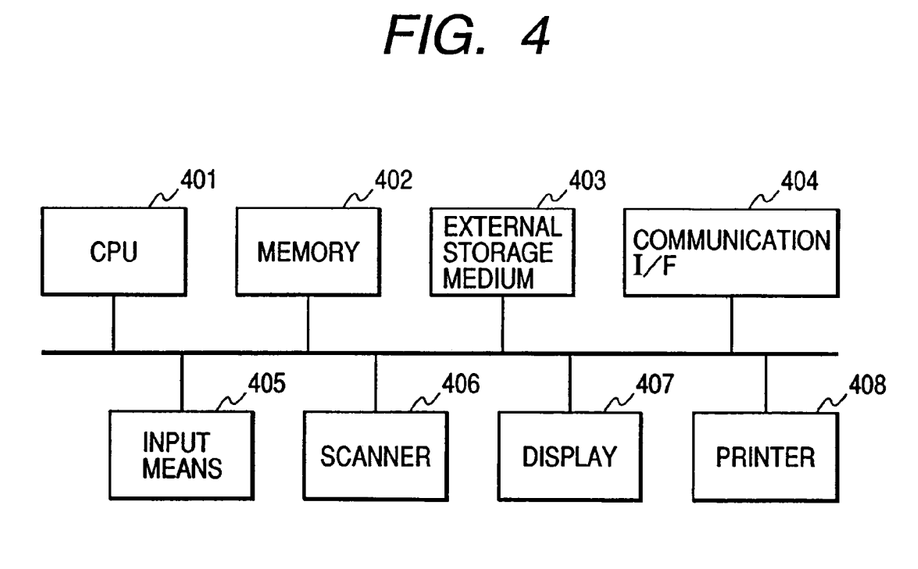
FIG. 4 shows a hardware configuration of devices according to the present invention.

FIG. 4 shows a hardware configuration of a device according to the present invention.

In FIG. 4, the numeral 401 shows a central processing unit (CPU), which controls processes according to the present invention by executing control program stored in memory 402. Steps shown in a flow chart described below are also executed by CPU 401. Memory 402 is a storage device consisting of RAMs, ROMs, and hard disks, in which control programs for the CPU 401 and various parameters, input image data, and character recognition dictionaries are stored. The numeral 403 shows an external storage medium which can be attached to and removed from the present device, such as optical disks, magnetic disks, magneto-optical disks, and magnetic tapes. Programs and data to be stored in memory 402 are read out from this external storage medium. Any result of processes is provided to external storage medium 403. The numeral 404 shows a communication I/F for communicating data to other terminals through a network or public circuit and programs and data to be stored in memory 402 and the process result may be provided through this communication I/F. The numeral 405 shows an input means such as a keyboard or pointing device, which is used to transmit the operator's instructions. Instructions to read images, to start character recognition, and to specify destination where text data resulting from a recognition process is stored are entered through input means 405. The numeral 406 shows a scanner which optically reads a document and provides a document image as electrical signals to the present device. The numeral 407 shows a display such as a CRT or liquid crystal display, which is used to display text data resulting from process as well as to be an interface for an operator. The numeral 408 shows a laser beam printer (LBP) or an ink jet printer, which is used to print out text data resulting from process in desired fonts.

Figure 1:
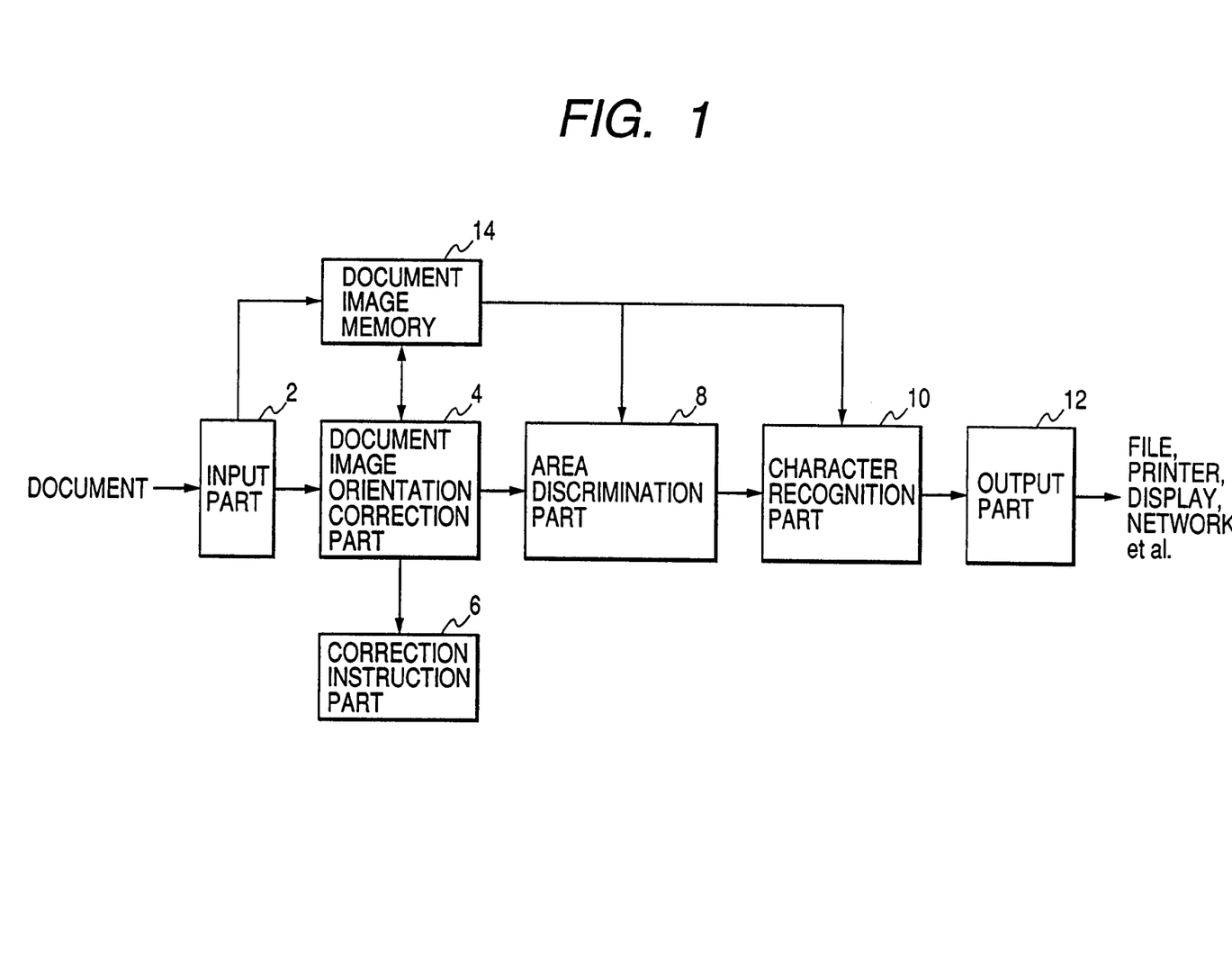
FIG. 1 is a functional block diagram according to the present invention.

FIG. 1 is a functional block diagram according to the present invention.

In FIG. 1, reference numeral 2 shows an input part for entering document images, which are fed into the present device from scanner 406 or external storage medium 403 or from other terminals through communication I/F 404. The numeral 4 shows a document image orientation correction part for correcting the orientation of an input document image, 6 is a correction instruction part, 8 is an area discrimination part for document images, and 10 is a character recognition part for recognizing characters, all of which may be implemented by CPU 401 as shown in the flow chart described below. The numeral 12 shows an output part for providing recognition results to display 407, printer 408, or external storage medium 403, or to other terminals through communication I/F 404. The numeral 14 shows a document image memory which may be implemented by memory 402.

An operation of devices according to the present invention is now described below.

A document is first converted to a predetermined image through input part 2 and stored in document image memory 14, regardless of mediums which contains the documents. Acquired document images are provided to document image orientation correction part 4 through document image memory 14 and whether any correction is required or not depends on an instruction from correction instruction part 6. If correction instruction part 6 does not indicate an instruction to correct the image, document image orientation correction part 4 does not perform any correction and then entered image of orientation is provided to area discrimination part 8. An operation of document image orientation correction part 4 and correction instruction part 6 will be described later in detail. Results of image correction performed by document image orientation correction part 4 is again accumulated in document image memory 14. Area discrimination part 8 analyzes images to divide it into subareas, depending its attribute such as character, table, drawing, image, and photograph, and then provides to memory 402 block data for each subarea which consists of the number assigned to area in order of area acquisition or closeness to a reference position in the coordinate system, the attribute, the size, and the position information. The block data is stored in memory 402. Image data within in a subarea having the attribute "character" which is determined to be a character area by area discrimination part 8 is transmitted to character recognition part 10 for character recognition. Text data resulting from the character recognition is transmitted to output part 12 and then provided as an output through display 407 or printer 408 in fonts corresponding to graphic character codes for the text data. During outputting the text, layout of an original document may be reproduced by arranging appropriate fonts within a character area where the text data was recognized based on the position information for the area contained in the block data. Alternatively, the text data resulting from the character recognition or both text and block data may be stored in external storage medium 403 or provided to other terminals through the communication I/F.

Now, document image orientation correction part 4 and correction instruction part 6 will be described below in detail.

Figure 2:
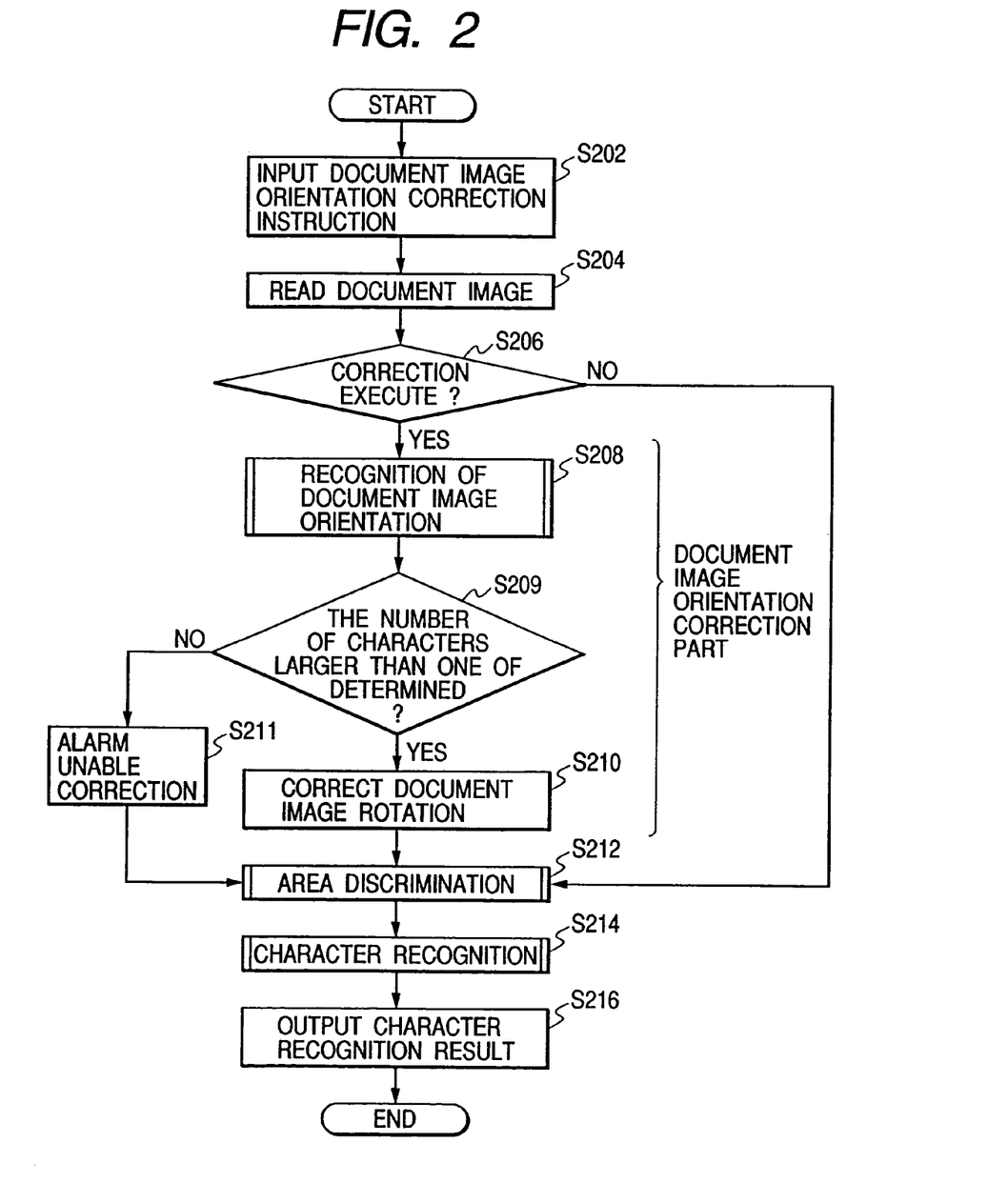
FIG. 2 is a flow chart for showing cooperation between a processes of a document image orientation correction part 4 and a correction instruction part 6.

FIG. 2 is a flow chart for showing cooperation between processes of document image orientation correction part 4 and correction instruction part 6.

Figure 3:
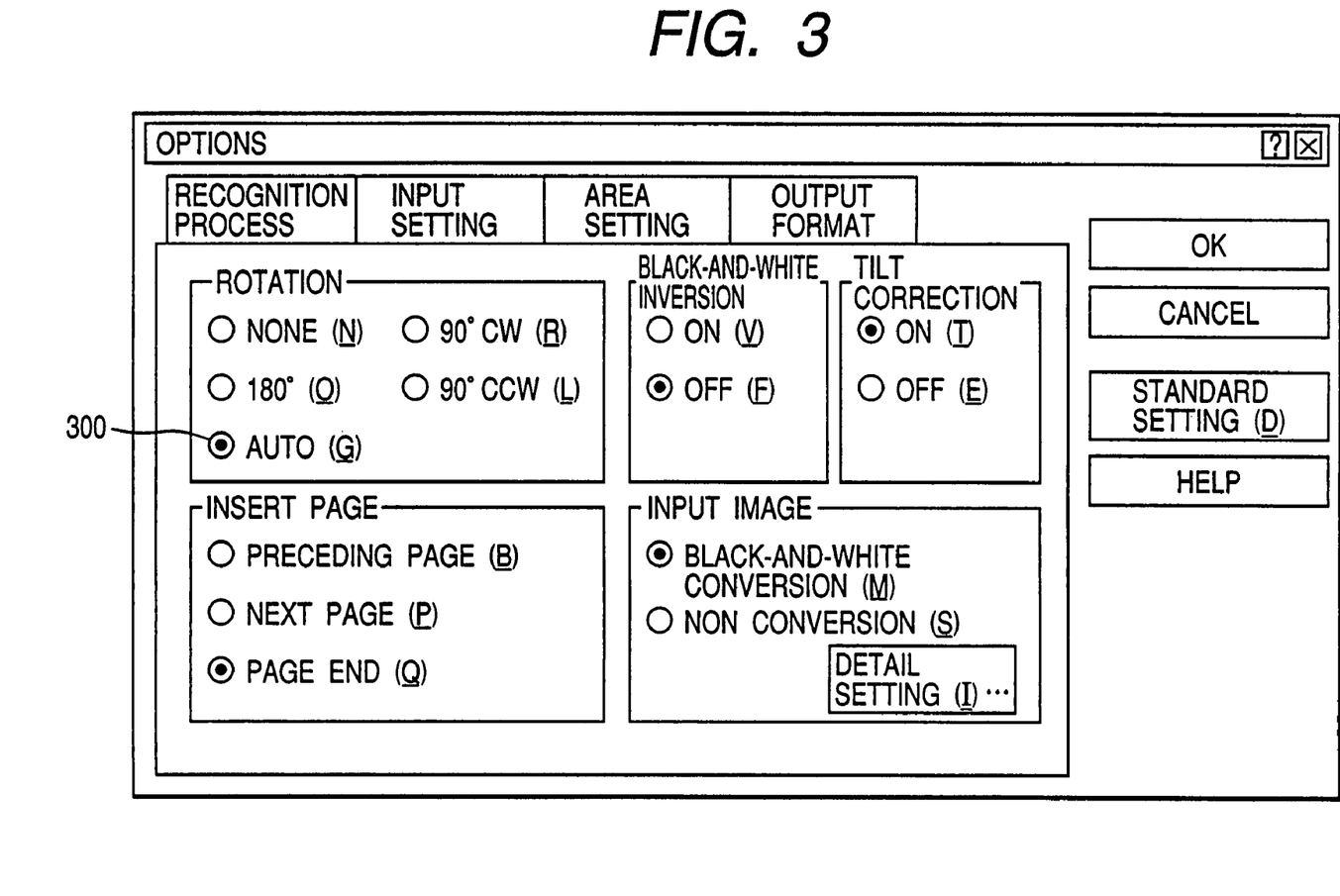
FIG. 3 shows an example of an input window for document image orientation correction instructions.

Step S202 is a routine to input a document image orientation correction instruction, wherein an operator uses input means 405 to specify a desired mode. The mode specified in this step, that is, the instruction as to whether the document image orientation should be automatically corrected is stored in memory 402. FIG. 3 shows an example of instruction input window actually displayed on display 407. When the checkbox for the instruction "Auto" (300) in the group "Rotation" on this window is marked, automatic orientation correction will be performed by document image orientation correction part 4. When the checkbox for the instruction "None" is marked, the automatic orientation correction will not be performed. It should be appreciated that marking of such an instruction checkbox is a signaling image to allow the operator to visually know whether instruction is selected and that the selection can be effected by placing a mouse cursor on instruction checkboxes and clicking a mouse button on it. For each of the groups "Rotation", "Black-and-White Inversion", "Tilt Correction", "Insert Page", and "Input Image", only one checkbox can be marked and if any one of the checkboxes within a group has been marked as described above, the other checkboxes within the group can not be marked, that is, the instructions associated with those checkboxes can not be selected. The selected instruction within each group is stored in memory 402 as flag data associated with the group data. Such flag data will be updated every time the mouse button is clicked. Even if the instruction "Auto" has been selected for the group "Rotation", the instruction "Auto" should be deselected when any of the other instructions "None", "90° CW", "180°" and "90° CCW" is selected. All the instructions selected on the instruction input window shown in FIG. 3 are stored in memory 402 as setting data for image input.

Step S204 is a routine to actually input a document, wherein, an instruction to read the document is issued to the driver for a scanner, if used, or document data read from a file is converted to a predetermined image and in either case, document data is stored in document image memory 14 in an expanded form.

Step S206 is a routine to decide subsequent process, depending on the instructions selected in step S202, wherein if it is determined from the setting data for image input stored in memory 402 that the document image orientation should be automatically corrected, the process proceeds with step S208. If it is determined in step S206 that the instruction "None" has been specified for rotation, the control is passed to step S212. If the instruction "90° CW", "180°" or "90° CCW" has been specified, document image processed in step S204 is rotated as specified and then control is passed to step S212. Rotation process is identical to that for step S210.

Step S208 is a routine to recognize orientation of document images based on the data stored in memory in step S204. In this step, character areas in document image are extracted for each language and then character patterns contained in each character area are rotated in the directions of 0°, 90°, 180°, and 270° so that a predetermined number of character patterns can be recognized by using appropriate dictionaries or in an appropriate manner to that language. From the recognition results, that of highest average similarity among the four directions is determined to be a reference orientation. For this purpose, an algorithm for determining the angle for portrait format orientation (0°, 90°, 180° or 270°) is assumed (see Japanese Patent Application No. 10-147620).

Step S209 is a routine wherein from the number of characters detected in the document image during character pattern extraction performed in step S208 as a pre-process for recognizing document image orientation, it is determined whether orientation recognized in step S208 is correct. Such a determination is accomplished by comparing the number of characters in the document image with a predetermined value previously stored in memory 402. If the number of characters in document image exceeds the predetermined value and therefore, it is determined that the orientation is correct, the process proceeds with step S210. Otherwise, that is, if the number of characters in the document image is less than the predetermined value, the control is passed to the step S211. This routine detects beforehand any document image containing much fewer characters, which may make it difficult to recognize the document image orientation.

Step S210 is a routine to rotate the document image stored in document image memory 14 to the reference orientation and to store corrected document image in document image memory 14 again on the basis of a rotation angle obtained at step S208.

Step S211 is a routine to give an alarm to an operator if it is determined in step S209 that the orientation discrimination for document image is not normal. As such an alarm, messages or signals is provided through display 407 or printer 408 or through a speaker (not shown), indicating that the document image orientation can not be automatically corrected.

Alternatively, in step S211, data which indicates that document image orientation could not be automatically corrected may be stored in memory 402 in correspondence to document images or data for the document image which could not be automatically corrected can be provided from the output part for further determination in response to the instructions specified by the operator through keyboard 405 during output process of character recognition results.

Step S212 is a routine wherein area discrimination part 8 discriminates area of the document image stored in document image memory 14. This also includes a pre-processing routine for area discrimination. Since area discrimination of this step is performed on image stored in document image memory 14, that image would have been rotated if an original document image has been rotated in step S210.

Step S214 is a routine to recognize character patterns contained in any character area of document image data stored in document image memory 14 according to result of area discrimination performed in step S212 through character recognition part 10.

Step S216 is a routine to convert text data resulting from the character discrimination of the step S214 to a predetermined form so that the data can be supplied as an output through output part 12.

As described above, according to the present invention, any document image can be automatically corrected in correct orientation during document reading by incorporating the novel document orientation recognition technique into a character recognition device through a user-friendly interface. Therefore, efforts required for confirmation before and after reading documents can be greatly reduced and a series of processes from document reading to the recognized character output can be performed at high precision.

In routine S209 described above, reliability of any orientation recognition result is determined based on the number of characters contained in the document. It should be appreciated, however, that this determination is not limited to the discrimination described for this embodiment and that if the maximum similarity resulting from the character recognition performed during the orientation recognition is less than a predetermined value (a reference value previously stored in memory 402), it may be determined that a result of orientation recognition has a lower reliability and a process may proceed with step S211 to give an alarm indicating that the correction could not be performed.

In routine S211 described above, an alarm is given if it is determined that any result of orientation recognition has a lower reliability. It should be appreciated, however, that the alarm is not limited to that described for this embodiment and that for example, after process ends in step S216, an image file containing the original document image stored in document image memory 14, text data resulting from the character recognition, and block data may be stored together with an identification index to indicate that orientation could not be recognized.

Now, process for the case where the "Auto" mode is specified for the "Rotation" function will be described below.

Figure 5:
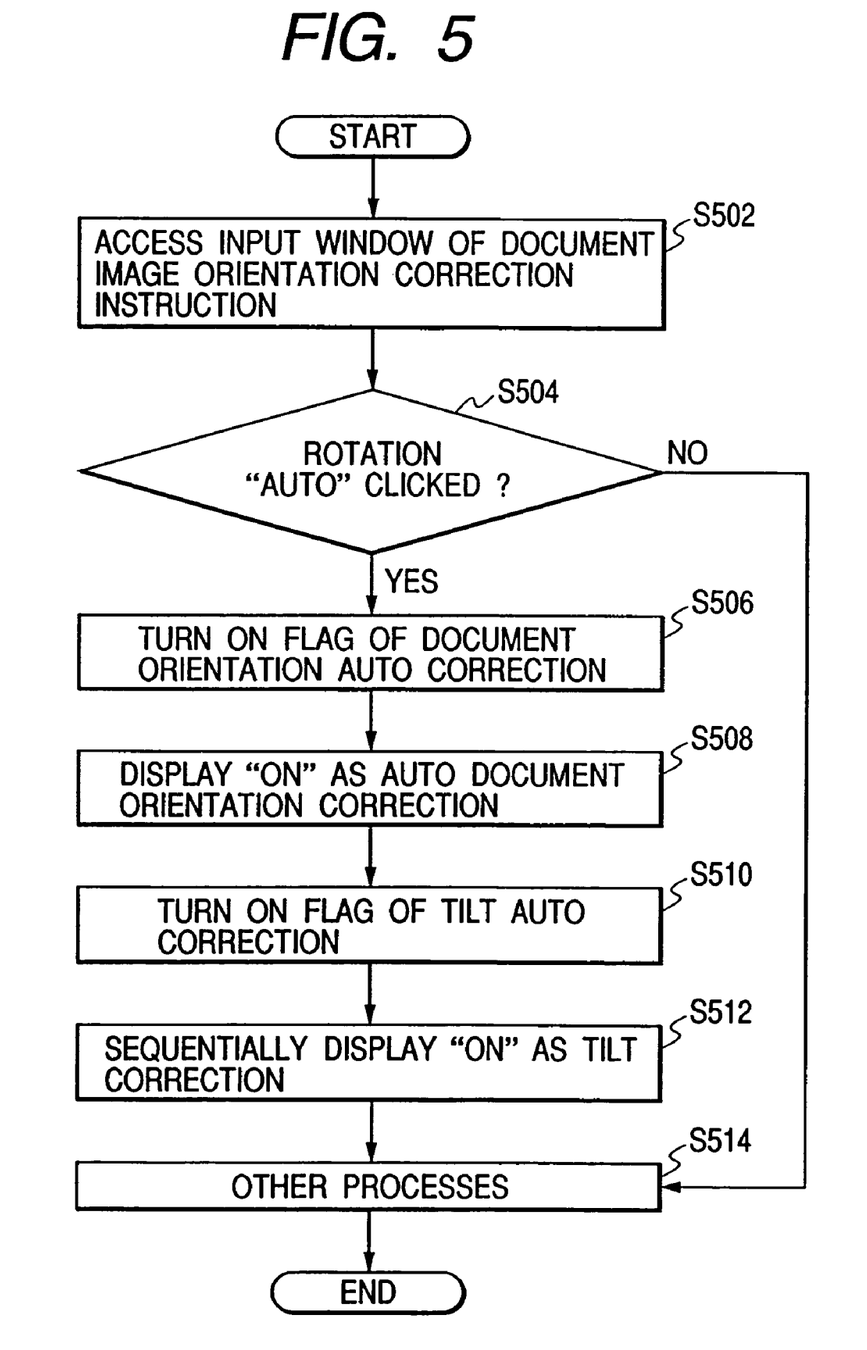
FIG. 5 is a flow chart for showing a process of a correction instruction part.

FIG. 5 shows the process performed by correction instruction part 6. The term "orientation correction" used hereinafter means automatic correction to be performed when an input document image is tilted at the angle of 90°, 180° or 270°, while the term "tilt correction" means another automatic correction to be performed when an input document image is tilted at a certain angle within ±45°.

Step S502 is a routine to access an input window for document image orientation correction instructions and to prompt an operator to input desired instructions. The operator will specify desired modes of operation by marking appropriate checkboxes on the instruction input window as shown in FIG. 3.

Step S504 is a routine to determine whether an orientation correction instruction has been specified in the instruction input window invoked in step S502, that is, the "Auto" mode has been selected for the "Rotation" function as shown in FIG. 3. If the "Auto" mode has been selected, process proceeds with step S506. Otherwise, control is passed to step S514 labelled "Other Processes".

Step S506 is a routine to turn on orientation correction flags in memory 402 when it is determined that orientations should be corrected.

Step S508 is a routine to mark the checkboxes for the instruction "Auto" for the "Rotation" function in the window as shown in FIG. 3 in response to turn-on operation of step S506.

Step S510 is a routine to turn on also tilt correction flags when it is determined in step S504 that orientations should be corrected. In other words, if the "Auto" mode has been selected for the "Rotation" function, the "Tilt Correction" function will be automatically turned on without a specific instruction from the operator.

Step S512 is a routine to mark the checkboxes for the instruction "ON" for the "Tilt Correction" function in the window as shown in FIG. 3 in response to the turn-on operation of step S510.

Step S514 is a routine to perform other processes required to finish instruction inputs.

Figure 6:
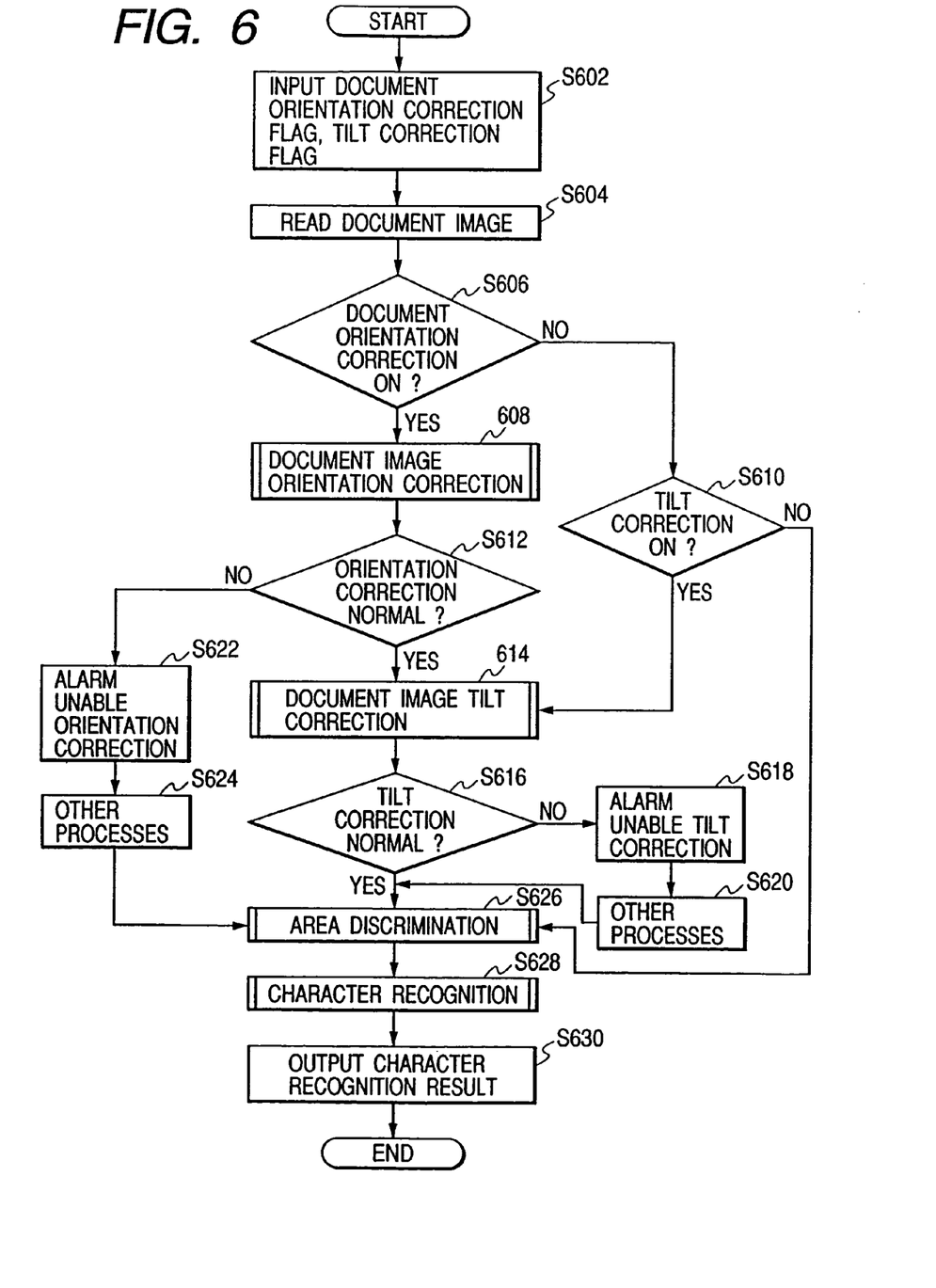
FIG. 6 is a flow chart for showing a process when an orientation correction is in Auto mode.

FIG. 6 is a flow chart for showing cooperation between processes performed by the correction control part, the document image orientation correction part, and the document image tilt correction part, respectively.

Step S602 is a routine to read out orientation correction flags and tilt correction flags from the memory, both of which have been specified through the correction instruction input part.

Step S604 is a routine to actually input a document, wherein an instruction to read documents is issued to a driver for a scanner, or document data read from a file is converted to a predetermined image and in either case, the document data of the input document is stored in memory 402 in an expanded form.

Step S606 is a routine to determine whether the orientation correction flag read out in step S602 is ON or OFF. If the flag is ON, control is passed to step S608 labelled "Document image orientation correction", and if the flag is OFF, process proceeds with step S610.

Step S608 is a routine to actually correct document image orientations. In this step, character areas in the document images are extracted for each language and then character patterns contained in each character area are rotated in directions of 0°, 90°, 180° and 270° for character recognition. From the recognition results, highest average similarity among the four directions is determined to be a reference orientation and then direction of reference orientation (0°, 90°, 180° or 270°) is provided to correct the document image orientations accordingly.

Step S612 is a routine to determine whether the document orientation has been corrected properly. The control is passed to step S622 labelled "Alarm unable orientation correction" if the correction was not proper, or to step S614 labelled "Document image tilt correction" if the correction was proper. In this step, accuracy for angle detection is determined based on the number of characters detected in the documents. That is, it will be determined in step S612 that correction was proper if the number of document images having a similarity more than a certain threshold is equal to or greater than a predetermined value after the orientation has been corrected in step S608. It should be appreciated, however, that the determination as to whether the correction was proper is not limited to that described for this embodiment and that it may be determined proper if maximum average similarity among those obtained for the four angles in step S608 exceeds a predetermined value. Such predetermined values used for determination have been previously stored in memory 402.

Step S610 is a routine to determine whether tilt correction flags read out in step S602 is ON or OFF. The control is passed to step S614 labelled "Document image tilt correction" if the flag is ON, or to the step S626 labelled "Area discrimination" if the flag is OFF.

Step S614 is a routine to actually correct the document image tilt. This correction may be accomplished by using any well-known method.

Step S616 is a routine to determine whether the document tilt has been corrected properly. The control is passed to step S618 labelled "Alarm unable tilt correction" if the correction was not proper, or to step S626 labelled "Area discrimination" if correction was proper.

Step S618 is a routine to activate an alarm window on display 407 so that the operator can know that the tilt correction was not proper.

Step S620 is a routine to forcefully terminate the process, for example, by closing the alarm window.

Step S622 is a routine to activate an alarm window on display 407 so that an operator can know that orientation corrections were not proper.

Step S624 is a routine to forcefully terminate process, for example, by closing the alarm window.

Step S626 is a routine to discriminate any document image area of the data stored in the document image memory. This also includes a preprocessing routine for area discrimination.

Step S628 is a routine to recognize characters based on the area division result of step S626 and document image data stored in the memory.

Step S630 is a routine to convert character recognition results of step S628 to a predetermined form.

It should be appreciated that if it is determined in step S612 or S616 that corrections were not proper, an identification index to indicate the determination may be stored together with the image file. In this case, an alarm required in step S622 or S618 may be omitted.

What is claimed is:

1. An image processing method for processing an input document image, said method comprising the steps of:
displaying an instruction input window to receive both of a first instruction and a second instruction from a user, wherein the instruction input window presents a plurality of checkbox groups each including a plurality of checkboxes, selection of only one checkbox being allowed for each checkbox group, and wherein the first instruction indicates, by selecting one of a plurality of checkboxes in a first checkbox group which includes a checkbox for auto discrimination of the document orientation and four checkboxes each for manual instruction of the document orientation corresponding to 0, 90, 180, and 270 degrees respectively, whether the orientation of the document image should be corrected automatically or manually, and wherein the second instruction indicates, by selecting one of a plurality of checkboxes in a second checkbox group which includes a checkbox for auto tilt correction and a checkbox for no tilt correction, whether or not a tilt of the document image should be automatically corrected;
determining, based on the first instruction corresponding to one of the checkboxes selected in the first checkbox group on the instruction input window, whether the user has instructed that the orientation of the document image should be corrected automatically or manually;
automatically discriminating the orientation of the document image as one of 0, 90, 180, and 270 degrees if it is determined in said determining step that the user has instructed, by selecting the checkbox for auto discrimination, that the orientation of the document image should be automatically corrected;
automatically rotating the document image based on the discriminated orientation of the document image if it is determined in said determining step that the user has instructed the orientation of the document image should be automatically corrected;
rotating the document image according to a rotation angle of one of 0, 90, 180 and 270 degrees corresponding the checkbox for manual instruction selected by the user if it is determined in said determining step that the user has instructed, by selecting one of the four checkboxes for manual instruction, that the orientation of the document image should be manually corrected; and
if it is determined based on the second instruction that the tilt of the document image should be automatically corrected, automatically correcting the tilt of the document image which is rotated in said automatic rotating step or in said rotating step, wherein said automatic correction step does not execute automatic correction of the tilt of the document image which is rotated in said automatic rotating step or in said rotating step if it is determined based on the second instruction that the tilt of the document image should not be automatically corrected.

2. An image processing method according to claim 1, wherein said automatic discrimination step includes discriminating the orientation of the document image by recognizing character images included in the document image.

3. An image processing method according to claim 1, further comprising a step of automatically setting the second instruction so that the tilt of the document image should be automatically corrected, if the first instruction is set by the user so that the orientation of the document image should be automatically corrected.

4. An image processing method according to claim 1, wherein the tilt angle of the document image is correctable if the tilt angle is within ±45 degrees.

5. An image processing method according to claim 1, wherein said automatic discrimination step includes outputting data indicating that the orientation of the document image cannot be discriminated, when the orientation of the document image cannot be discriminated.

6. An image processing method according to claim 5, further comprising a step of storing the outputted data as information relating to the document image when the orientation of the document image cannot be discriminated.

7. An image processing device for processing an input document image comprising:
- means for displaying an instruction input window to receive both of a first instruction and a second instruction from a user, wherein the instruction input window presents a plurality of checkbox groups each including a plurality of checkboxes, selection of only one checkbox being allowed for each checkbox group, and wherein the first instruction indicates, by selecting one of a plurality of checkboxes in a first checkbox group which includes a checkbox for auto discrimination of the document orientation and four checkboxes each for manual instruction of the document orientation corresponding to 0, 90, 180, and 270 degrees respectively, whether the orientation of the document image should be corrected automatically or manually, and wherein the second instruction indicates, by selecting one of a plurality of checkboxes in a second checkbox group which includes a checkbox for auto tilt correction and a checkbox for no tilt correction, whether or not a tilt of the document image should be automatically corrected;
- means for determining, based on the first instruction corresponding to one of the checkboxes selected in the first checkbox group on the instruction input window, whether the user has instructed that the orientation of the document image should be corrected automatically or manually;
- means for automatically discriminating the orientation of the document image as one of 0, 90, 180, and 270 degrees if said determining means determines that the user has instructed, by selecting the checkbox for auto discrimination, that the orientation of the document image should be automatically corrected;
- means for automatically rotating the document image based on the discriminated orientation of the document image if said determining means determines that the user has instructed the orientation of the document image should be automatically corrected;
- means for rotating the document image according to a rotation angle of one of 0, 90, 180 and 270 degrees corresponding to the checkbox for manual instruction selected by the user if said determining means determines that the user has instructed, by selecting one of the four checkboxes for manual instruction, that the orientation of the document image should be manually corrected; and
- means for, if it is determined based on the second instruction that the tilt of the document image should be automatically corrected, automatically correcting the tilt of the document image which is rotated by said automatic rotating means or by said rotating means, wherein said automatic correction means does not execute automatic correction of the tilt of the document image which is rotated in said automatic rotating means or in said rotating means if it is determined based on the second instruction that the tilt of the document image should not be automatically corrected.

8. An image processing device according to claim 7, wherein said means for automatically discriminating the orientation of the document image discriminates the orientation of the document image by recognizing character images included in the document image.

9. An image processing device according to claim 7, further comprising means for automatically setting the second instruction so that the tilt of the document image should be automatically corrected, if the first instruction is set by the user so that the orientation of the document image should be automatically corrected.

10. An image processing device according to claim 7, wherein the tilt angle of the document image is correctable if the tilt angle is within ±45 degrees.

11. An image processing device according to claim 7, wherein said means for automatically discriminating the orientation of the document image outputs data indicating that the orientation of the document image cannot be discriminated when the orientation of the document image cannot be discriminated.

12. An image processing device according to claim 11, further comprising means for storing the outputted data as information relating to the document image when the orientation of the document image cannot be discriminated.

13. A computer-readable storage medium containing a program for executing processing of an input document image, the program comprising code for:
- displaying an instruction input window to receive both of a first instruction and a second instruction from a user, wherein the instruction input window presents a plurality of checkbox groups each including a plurality of checkboxes, selection of only one checkbox being allowed for each checkbox group, and wherein the first instruction indicates, by selecting one of a plurality of checkboxes in a first checkbox group which includes a checkbox for auto discrimination of the document orientation and four checkboxes each for manual instruction of the document orientation corresponding to 0, 90, 180, and 270 degrees respectively, whether the orientation of the document image should be corrected automatically or manually, and wherein the second instruction indicates, by selecting one of a plurality of checkboxes in a second checkbox group which includes a checkbox for auto tilt correction and a checkbox for no tilt correction, whether or not a tilt of the document image should be automatically corrected;
- determining, based on the first instruction corresponding to one of the checkboxes selected in the first checkbox group on the instruction input window, whether the user has instructed that the orientation of the document image should be corrected automatically or manually;
- automatically discriminating the orientation of the document image as one of 0, 90, 180, and 270 degrees if it is determined in said determining step that the user has instructed, by selecting the checkbox for auto discrimination, that the orientation of the document image should be automatically corrected;
- automatically rotating the document image based on the discriminated orientation of the document image if it is determined in said determining step that the user has instructed the orientation of the document image should be automatically corrected;
- rotating the document image according to a rotation angle of one of 0, 90, 180 and 270 degrees corresponding the checkbox for manual instruction selected by the user if it is determined in said determining step that the user has instructed, by selecting one of the four checkboxes for manual instruction, that the orientation of the document image should be manually corrected; and
- if it is determined based on the second instruction that the tilt of the document image should be automatically corrected, automatically correcting the tilt of the document image which is rotated in said automatic rotating step or in said rotating step, wherein said automatic correction step does not execute automatic correction of the tilt of the document image which is rotated in said automatic rotating step or in said rotating step if it is determined based on the second instruction that the tilt of the document image should not be automatically corrected.

14. A computer-readable storage medium according to claim 13, wherein said code for automatic discrimination causes discrimination of the orientation of the document image by recognizing character images included in the document image.

15. A computer-readable storage medium according to claim 13, further comprising code for automatically setting the second instruction so that the tilt of the document image should be automatically corrected, if the first instruction is set by the user so that the orientation of the document image should be automatically corrected.

16. A computer-readable storage medium according to claim 13, wherein the tilt angle of the document image is correctable if the tilt angle is within ±45 degrees.

17. A computer-readable storage medium according to claim 13, wherein said code for automatic discrimination causes outputting of data indicating that the orientation of the document image cannot be discriminated when the orientation of the document image cannot be discriminated.

18. A computer-readable storage medium according to claim 17, further comprising code for storing the outputted data as information relating to the document image when the orientation of the document image cannot be discriminated.

* * * * *

UNITED STATES PATENT AND TRADEMARK OFFICE
CERTIFICATE OF CORRECTION

| | |
|---|---|
| PATENT NO. | : 7,305,619 B2 |
| APPLICATION NO. | : 10/748208 |
| DATED | : December 4, 2007 |
| INVENTOR(S) | : Kitahiro Kaneda et al. |

It is certified that error appears in the above-identified patent and that said Letters Patent is hereby corrected as shown below:

ON TITLE PAGE [57] ABSTRACT:

Line 7, "entations" should read --entation--.

COLUMN 8:

Line 29, "corresponding" should read --corresponding to--.

COLUMN 10:

Line 56, "corresponding" should read --corresponding to--.

Signed and Sealed this

Tenth Day of March, 2009

JOHN DOLL
*Acting Director of the United States Patent and Trademark Office*